(12) United States Patent
Go et al.

(10) Patent No.: US 11,894,715 B2
(45) Date of Patent: Feb. 6, 2024

(54) CHARGE CONTROL SYSTEM AND CHARGE CONTROL METHOD

(71) Applicant: TOYOTA JIDOSHA KABUSHIKI KAISHA, Toyota (JP)

(72) Inventors: Koichi Go, Nisshin (JP); Tatsuya Miyoshi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1418 days.

(21) Appl. No.: 16/101,205

(22) Filed: Aug. 10, 2018

(65) Prior Publication Data
US 2019/0074711 A1 Mar. 7, 2019

(30) Foreign Application Priority Data

Sep. 7, 2017 (JP) .................................. 2017-172067
Oct. 25, 2017 (JP) .................................. 2017-206446

(51) Int. Cl.
*H02J 7/35* (2006.01)
*H02J 7/00* (2006.01)

(52) U.S. Cl.
CPC .............. *H02J 7/35* (2013.01); *H02J 7/0013* (2013.01); *H02J 7/0048* (2020.01)

(58) Field of Classification Search
CPC .............................. H02J 7/35; Y02T 10/7072
See application file for complete search history.

(56) References Cited

U.S. PATENT DOCUMENTS

| 2010/0102773 A1* | 4/2010 | Lipcsei | H02J 7/35 |
| | | | 320/101 |
| 2012/0136534 A1* | 5/2012 | Walsh | B60K 16/00 |
| | | | 701/36 |
| 2013/0320911 A1* | 12/2013 | Kamiya | B60L 53/22 |
| | | | 320/101 |
| 2014/0008978 A1 | 1/2014 | Sasaki et al. | |
| 2016/0089986 A1 | 3/2016 | Maeno | |

FOREIGN PATENT DOCUMENTS

| JP | 2014-007937 A | 1/2014 |
| JP | 2015-188308 A | 10/2015 |
| JP | 5977658 B2 | 8/2016 |
| WO | 2014/184954 A1 | 11/2014 |

OTHER PUBLICATIONS

Go et al., "Development Solar Charging System of Vehicle," SAE International, Mar. 28, 2017, pp. 353-358.

* cited by examiner

*Primary Examiner* — Samuel Berhanu
(74) *Attorney, Agent, or Firm* — Oliff PLC (57) ABSTRACT

A charge control system including a solar panel configured to generate electric power with sunlight, a chargeable and dischargeable first battery, a chargeable and dischargeable second battery, and a charge control unit connected to the solar panel, the first battery and the second battery, and a method of the charge control system are provided. The charge control unit is configured to switch between a first mode (indirect charge mode) in which a process of charging the first battery with electric power generated by the solar panel and a process of charging the second battery with electric power stored in the first battery are repeatedly executed depending on a state of charge of the first battery and a second mode (direct charge mode) in which electric power generated by the solar panel is directly charged into the second battery based on at least electric power generated by the solar panel.

12 Claims, 5 Drawing Sheets

CHARGE CONTROL SYSTEM AND CHARGE CONTROL METHOD

CROSS-REFERENCE TO RELATED APPLICATIONS

This application claims priority to Japanese Patent Application No. 2017-206446 filed on Oct. 25, 2017, which is incorporated herein by reference in its entirety.

BACKGROUND

1. Technical Field

The disclosure relates to a charge control system that uses a solar panel, and a charge control method that is executed in the charge control system.

2. Description of Related Art

For example, Japanese Unexamined Patent Application Publication No. 2014-007937 (JP 2014-007937 A) describes a system that has improved a charging efficiency by executing a process of initially charging a solar battery that is a temporary storage battery with electric power generated by a solar panel and then charging a main battery with the electric power stored in the solar battery.

SUMMARY

In the system described in JP 2014-007937 A, charging of the solar battery and discharging of the solar battery are simply switched in response to a change in the state of charge (SOC) of the solar battery. For this reason, when the electric power generated by the solar panel is high, the efficiency of use of the generated electric power in the system can decrease.

The process of alternately charging and discharging the solar battery influences the durability and service life of the solar battery and also the durability and service life of a relay circuit that connects the solar panel to the main battery. For this reason, blindly increasing the number of times of the process of alternately charging and discharging the battery is not desirable for the system.

The disclosure is made in view of the above inconvenience, and provides a charge control system that is able to reduce the number of times of a process of alternately charging and discharging a battery while minimizing a decrease in the efficiency of use of electric power generated by a solar panel.

An aspect of the disclosure provides a charge control system. The charge control system includes a solar panel, a first battery, a second battery and a charge control unit. The solar panel is configured to generate electric power with sunlight. The first battery is configured to be chargeable and dischargeable. The second battery is configured to be chargeable and dischargeable. The charge control unit is connected to the solar panel, the first battery, and the second battery. The charge control unit is configured to switch between a first mode and a second mode based on at least electric power generated by the solar panel. The first mode is an indirect charge mode in which a process of charging the first battery with electric power generated by the solar panel and a process of charging the second battery with electric power stored in the first battery are repeatedly executed depending on a state of charge of the first battery. The second mode is a direct charge mode in which electric power generated by the solar panel is directly charged into the second battery.

With the thus configured charge control system, the first mode and the second mode are switched based on at least electric power generated by the solar panel. Thus, it is possible to prevent charging of the battery while the efficiency of use of the generated electric power remains low. Since the second mode is executed, it is possible to reduce the number of times of the process of alternately charging and discharging the first battery in the first mode.

In the charge control system, the charge control unit may be configured to change the charge mode at timing different from timing at which the generated electric power varies across a first threshold such that the charge control unit selects one charge mode having higher efficiency of use of the generated electric power than the efficiency of use of the generated electric power of another charge mode, when the electric power generated by the solar panel varies across the first threshold at which a relationship, that is whether or not the efficiency of use of the generated electric power with respect to the electric power in the first mode is higher than the efficiency of use of the generated electric power with respect to the electric power in the second mode, changes. The first threshold may be a value that is obtained based on factors including an electric power consumption and an electric power loss in the charge control system.

With the thus configured charge control system, since the charge mode is not immediately switched even when the electric power generated by the solar panel has varied across the first threshold, it is possible to avoid a situation in which the first mode and the second mode are frequently switched as a result of instantaneous fluctuations in the electric power generated by the solar panel (control chattering).

In the charge control system, the charge control unit may be configured to change the charge mode from the second mode into the first mode, when, during execution of the second mode, electric power generated by the solar panel becomes lower than or equal to a second threshold lower than the first threshold. The second threshold may be a lower limit electric power value up to which a decrease in the efficiency of use of electric power generated by the solar panel is permitted.

With the thus configured charge control system, when a lower limit electric power value up to which a decrease in the efficiency of use of the electric power generated by the solar panel in the charge control system is permitted is set for the second threshold, it is possible to continuously execute the second mode. Thus, it is possible to reduce the number of times of the process of alternately charging and discharging the first battery in the first mode.

In the charge control system, the charge control unit may be configured to change the charge mode into the first mode, when electric power generated by the solar panel falls in a range from the first threshold to the second threshold and, during execution of the second mode, a cumulative amount of generated electric power exceeding the first threshold for a predetermined period becomes smaller than a cumulative amount of generated electric power shorter than or equal to the first threshold during the predetermined period.

With the thus configured charge control system, even when electric power generated by the solar panel does not reach a lower limit electric power value, but when it is determined that the efficiency of use of electric power generated by the solar panel has remarkably decreased based on the cumulative amounts of generated electric power, it is possible to change the charge mode from the second mode to the first mode. Thus, it is possible to reduce the number of times of the process of alternately charging and discharging the first battery in the first mode, and it is possible to prevent execution of a second-mode charge process while the efficiency of use of the generated electric power remains low.

In the charge control system, the charge control unit may be configured to change the charge mode into the second mode after a lapse of a predetermined time from when the charge mode has been switched, when electric power generated by the solar panel exceeds the first threshold during execution of the first mode.

With the thus configured charge control system, even when the electric power generated by the solar panel exceeds the first threshold, it is possible to continuously execute the first mode until the predetermined time elapses. Thus, it is possible to avoid a situation in which the first mode and the second mode are frequently switched as a result of instantaneous fluctuations in the electric power generated by the solar panel.

In the charge control system, the charge control unit may be configured to directly charge the second battery with at least an amount of electric power up to a third threshold out of electric power generated by the solar panel and charge the first battery with a remaining surplus electric power that is not directly charged into the second battery. The third threshold may be a minimum required electric power value for charging the second battery, when the charge mode has been switched into the second mode, as long as electric power generated by the solar panel exceeds the third threshold higher than the first threshold.

With the thus configured charge control system, for example, when the second battery has a set minimum required predetermined electric power value for charging, and when electric power generated by the solar panel exceeds a predetermined electric power value (=third threshold), an amount of surplus electric power exceeding the predetermined electric power value (third threshold) is charged into the first battery while executing the second mode. Thus, waste of generated electric power, such as disposing surplus electric power, does not occur.

In the charge control system, the charge control unit may be configured to not charge the first battery with the surplus electric power, even when electric power generated by the solar panel exceeds the third threshold but when the state of charge of the first battery increases to a predetermined upper limit. With such control over the charge control system, it is possible to avoid a situation in which the first battery is charged to exceed an upper limit and becomes an overcharged state.

In the thus configured charge control system, the charge control unit may be configured to directly charge the second battery with all the electric power generated by the solar panel and charge the second battery from the first battery with electric power corresponding to a shortage of the generated electric power below the third threshold, when the charge mode has been switched into the second mode, as long as electric power generated by the solar panel does not exceed the third threshold higher than the first threshold.

With the thus configured charge control system, for example, when the second battery has a set minimum required predetermined electric power value for charging, and when electric power generated by the solar panel is lower than the predetermined electric power value (=third threshold), execution of the second mode is continued by charging the second battery from the first battery with electric power corresponding to a shortage of the generated electric power below the predetermined electric power value (third threshold). Thus, it is possible to prevent the charge mode from being immediately switched from the second mode to the first mode, so it is possible to avoid a situation in which the first mode and the second mode are frequently switched.

In the charge control system, the charge control unit may be configured to change the charge mode into the first mode, even when electric power generated by the solar panel does not exceed the third threshold but when the state of charge of the first battery decreases to a predetermined lower limit. With such control of the charge control unit, it is possible to avoid a situation in which the first battery is discharged to become lower than a lower limit and becomes an overdischarged state.

Each of the processes that are executed by the charge control unit of the above-described charge control system may be regarded as a charge control method that provides a series of procedure. This method is provided in a format of a program for causing a computer to execute a series of procedure. The program may be introduced into a computer in a mode recorded in a computer-readable recording medium.

As described above, with the charge control system according to the disclosure, it is possible to reduce the number of times of the process of alternately charging and discharging the battery while minimizing a decrease in the efficiency of use of electric power generated by the solar panel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A charge control system and charge control method that use a solar panel according to the disclosure charges a battery while changing into a charge mode of a higher efficiency of use of electric power generated by the solar panel in the charge control system based on the magnitude of the generated electric power. Thus, it is possible to prevent charging of the battery while the efficiency of use of the generated electric power remains low.

Figure 1:
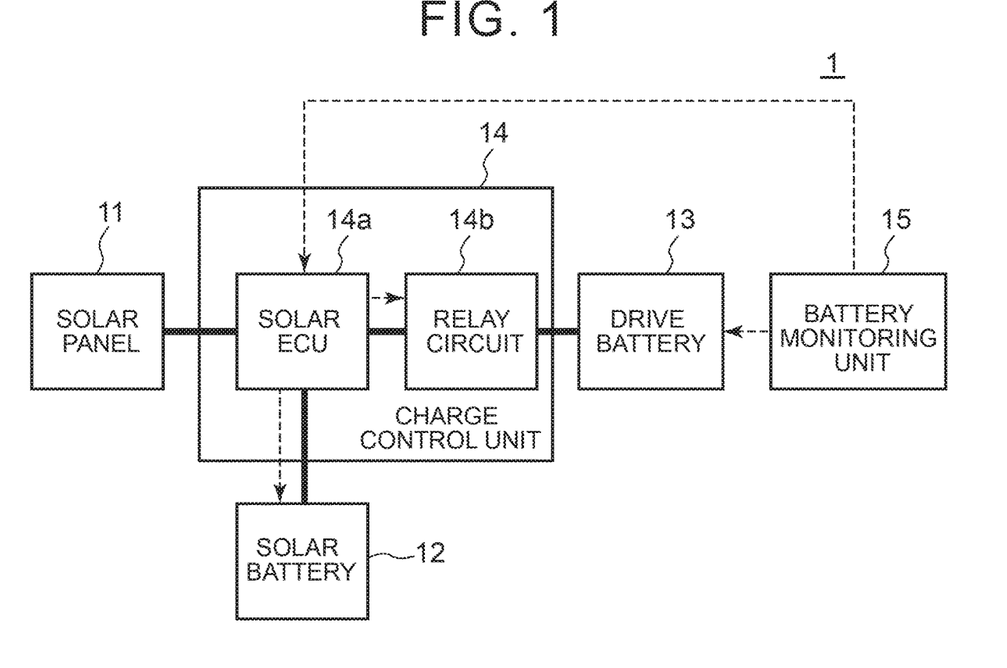
FIG. 1 is a block diagram that shows an example of the configuration of a charge control system according to an embodiment of the disclosure.

Initially, the configuration of the charge control system will be described. FIG. 1 is a block diagram that shows an example of the configuration of a charge control system 1 according to an embodiment of the disclosure. The charge control system 1 illustrated in FIG. 1 includes a solar panel 11, a solar battery 12, a drive battery 13, a charge control unit 14, and a battery monitoring unit 15. In FIG. 1, wires that carry electric power are indicated by continuous lines, and wires that carry control signals, and the like, other than electric power, are indicated by broken lines.

The solar panel 11 is, for example, a solar cell module that generates electric power upon receiving irradiation with sunlight. The amount of electric power that is generated by the solar panel 11 depends on a solar irradiance. Electric power generated by the solar panel 11 is output to the charge control unit 14. The solar panel 11 may be installed on, for example, a roof of a vehicle, or the like.

The solar battery 12 is an electric power storage element configured to be chargeable and dischargeable, and is, for example, a lead storage battery, a nickel-metal hydride battery, or the like. The solar battery 12 is connected to the charge control unit 14 so as to be able to be charged with electric power generated by the solar panel 11 and so as to be able to discharge electric power stored in itself to the drive battery 13. The solar battery 12 corresponds to a "first battery" of the disclosure.

The drive battery 13 is an electric power storage element configured to be chargeable and dischargeable, and is, for example, a lead storage battery, a nickel-metal hydride battery, or the like. The drive battery 13 is connected to the charge control unit 14 so as to be able to be charged with electric power generated by the solar panel 11 and so as to be able to be charged with electric power stored in the solar battery 12. The drive battery 13 is connected to a predetermined device for driving a vehicle (not shown), and supplies source electric power that needs to operate the device. The drive battery 13 corresponds to a "second battery" of the disclosure.

The battery monitoring unit 15 is configured to be able to monitor the state of charge (SOC) of the drive battery 13, and provides a monitored result to the charge control unit 14, or the like. Only while the drive battery 13 is being charged under control of the charge control unit 14 (described later), the battery monitoring unit 15 is supplied with electric power from a predetermined battery and is able to monitor the state of charge (SOC) of the drive battery 13.

The charge control unit 14 is connected to the solar panel 11, the solar battery 12, the drive battery 13, and the battery monitoring unit 15. The charge control unit 14 monitors the state of charge (SOC) of the solar battery 12. The charge control unit 14 is configured to be able to control charging of each battery with electric power X that is generated by and input from the solar panel 11, based on the magnitude of the generated electric power X and the state of charge of the solar battery 12. Specifically, the charge control unit 14 switches between a first mode and a second mode based on at least the electric power X generated by the solar panel 11 such that the efficiency of use of the generated electric power X improves.

A first-mode charge process is a process of repeating a process A and a process B depending on the state of charge of the solar battery 12. In the process A, the solar battery 12 is charged with the electric power X generated by the solar panel 11. In the process B, the drive battery 13 is charged with the electric power X generated by the solar panel 11 and the electric power stored in the solar battery 12. Specifically, the process A is executed until the state of charge of the solar battery 12 reaches a predetermined upper limit and then the process B is executed until the state of charge of the solar battery 12 reaches a predetermined lower limit. In this manner, the process A and the process B are repeatedly executed. That is, the first-mode charge process is a process of indirectly charging the drive battery 13 with the electric power X generated by the solar panel 11 via the solar battery 12.

On the other hand, a second-mode charge process is a process of directly charging the drive battery 13 with all or part of the electric power X generated by the solar panel 11.

Figure 2:
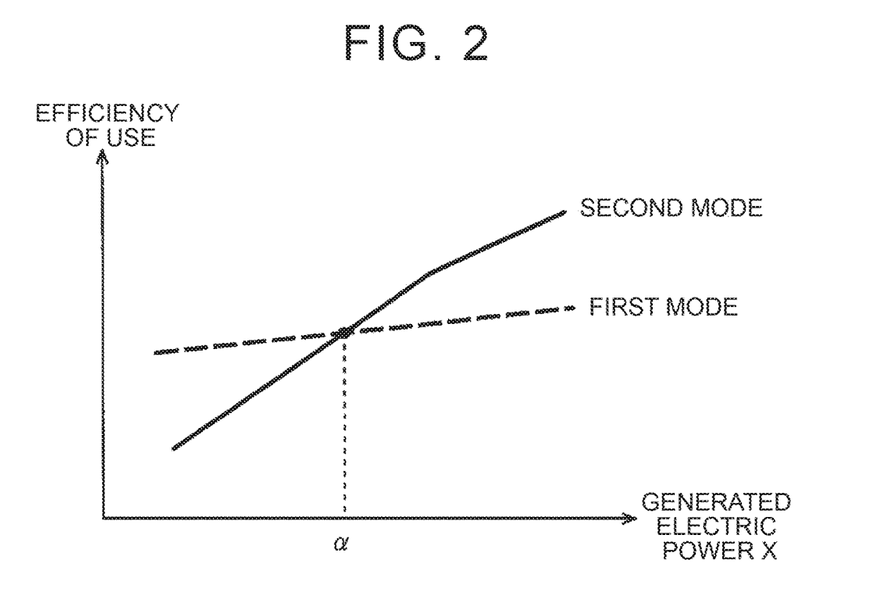
FIG. 2 is a graph that shows the relation between electric power generated by a solar panel shown in FIG. 1 and an efficiency of use of the charge control system.

As shown in FIG. 2, as for the efficiency of use of the electric power X generated by the solar panel 11 in the charge control system 1, the efficiency of use in the first-mode charge process and the efficiency of use in the second-mode charge process change in magnitude relation at a point of a predetermined threshold α (which corresponds to a "first threshold" of the disclosure). Therefore, when the electric power X generated by the solar panel 11 is lower than or equal to the threshold α, the efficiency of use of the generated electric power is higher in the first-mode charge process than in the second-mode charge process. When the electric power X generated by the solar panel 11 exceeds the threshold α, the efficiency of use of the generated electric power is higher in the second-mode charge process than in the first-mode charge process.

The threshold α may be obtained based on an electric power consumption of a DC-DC converter (not shown) that is used in the charge control system 1, an electric power loss (wire loss) due to a wire that connects the charge control unit 14 to the solar battery 12, an electric power loss (charge-discharge loss) based on the charge-discharge efficiency of the solar battery 12, an electric power loss (power supply loss) resulting from power supply for activating the battery monitoring unit 15, and the like.

The charge control unit 14, for example, includes a solar electronic control unit (ECU) 14a and a relay circuit 14b. The solar ECU 14a has a predetermined electric power conversion function. The solar ECU 14a is able to convert (step up or step down) electric power generated by the solar panel 11 to a predetermined voltage and store electric power in the solar battery 12. The solar ECU 14a is also able to convert (step up or step down) electric power stored in the solar battery 12 to a predetermined voltage and discharge the converted electric power to the drive battery 13. The solar ECU 14a interrupts connection of the charge control unit 14 with the drive battery 13 by activating the relay circuit 14b while the process A in the first mode is being executed. While the relay circuit 14b is active, supply of electric power to the battery monitoring unit 15 is stopped.

Next, control that the charge control system executes will be described. Charging control that the charge control system 1 according to the embodiment of the disclosure executes will be described further with reference to FIG. 3 to FIG. 8.

Figure 3:
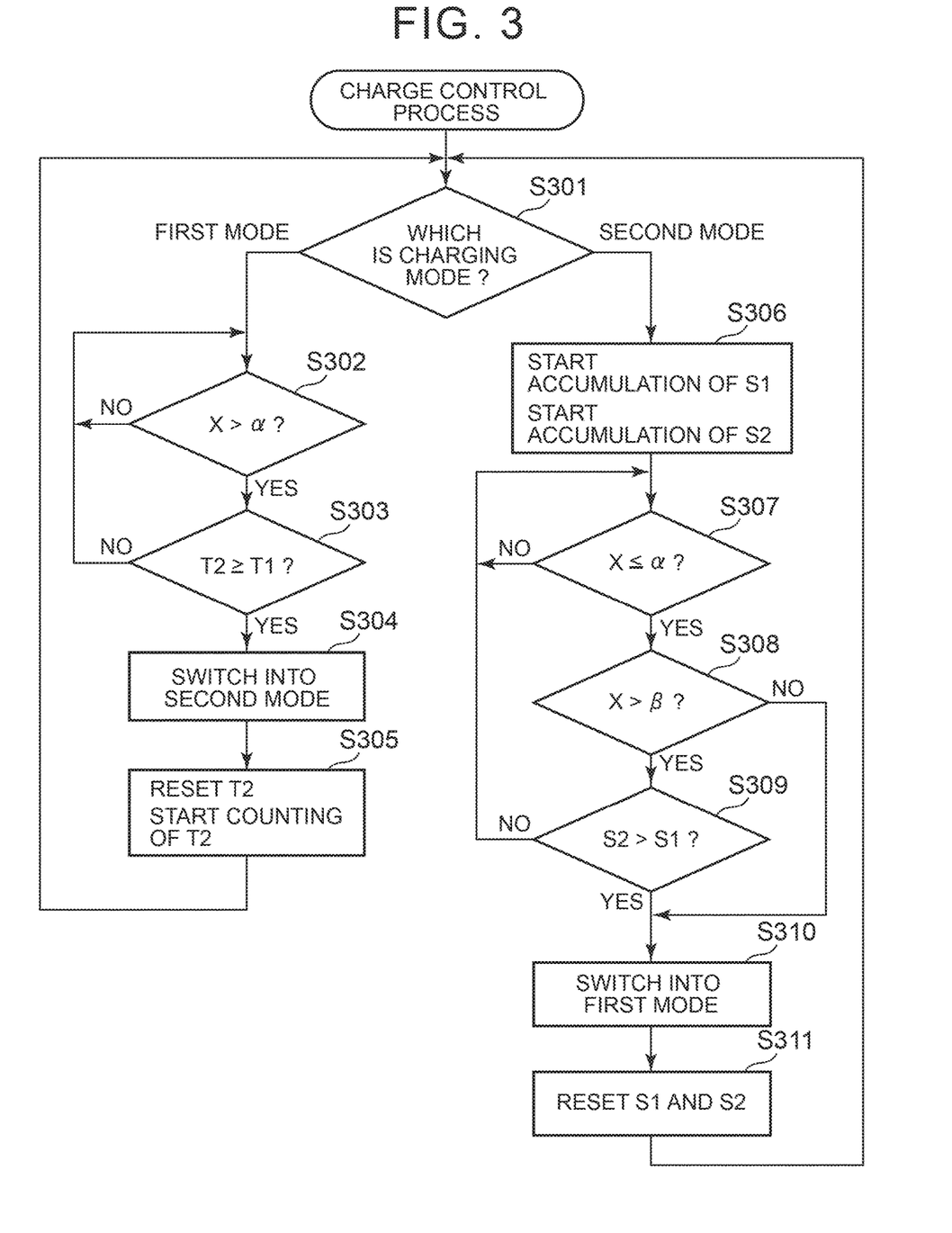
FIG. 3 is a flowchart that illustrates the procedure of first charge control that a charge control unit shown in FIG. 1 executes.
Figure 4:
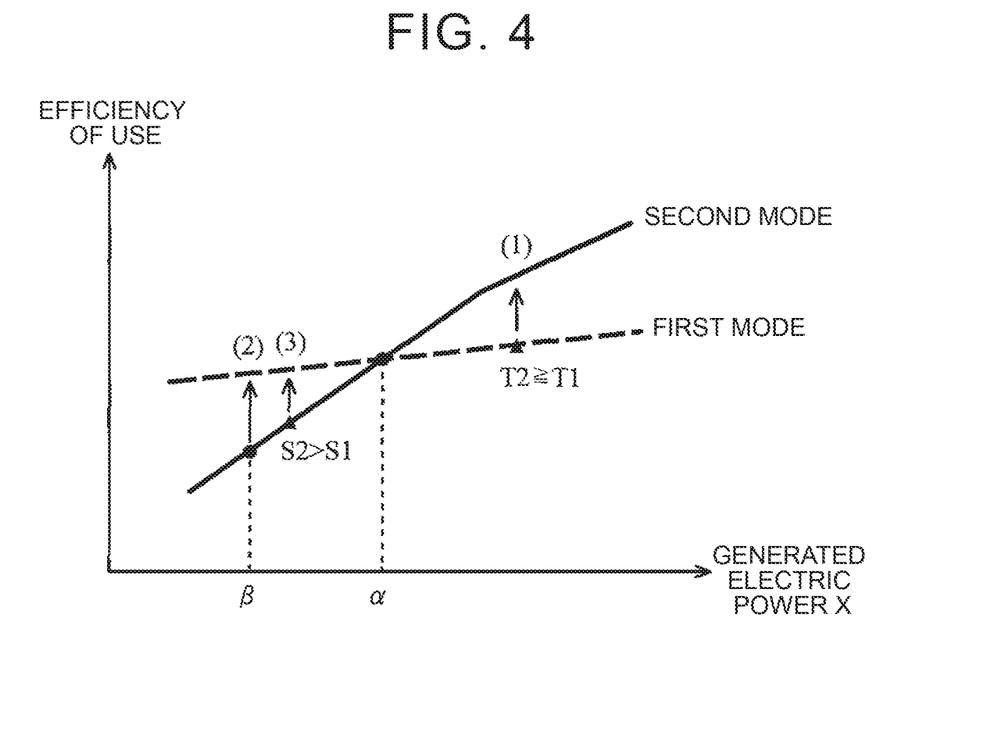
FIG. 4 is a graph that shows mode switching timing in the first charge control that the charge control unit executes.
Figure 5:
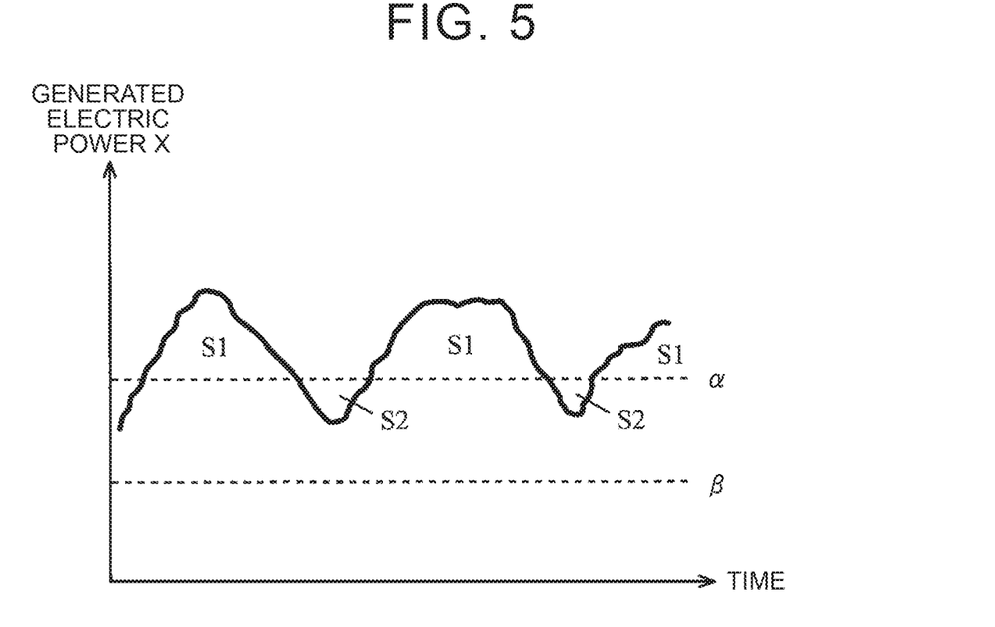
FIG. 5 is a graph that shows an example of fluctuations in generated electric power in a second-mode charge process that the charge control unit executes.

Next, first charge control will be described. FIG. 3 is a flowchart that illustrates the procedure of the first charge control that the charge control unit 14 of the charge control system 1 executes. FIG. 4 is a graph that shows the timing of switching between the first mode and the second mode in the first charge control. FIG. 5 is a graph that shows an example of fluctuations in generated electric power X in the second-mode charge process.

The first charge control shown in FIG. 3 is started as the charge control system 1 operates as a result of, for example, power on, or the like, and is repeatedly executed until the charge control system 1 stops as a result of, for example, power off, or the like.

In step S301, it is determined whether the currently executing charge mode is the first mode or the second mode. The charge mode just after the charge control system 1 begins to operate may be, for example, set to any one of the first mode and the second mode as a default in advance or may be determined based on the electric power X generated by the solar panel 11 just after the charge control system 1 begins to operate. When the charge mode is the first mode, the process proceeds to step S302. When the charge mode is the second mode, the process proceeds to step S306.

In step S302, it is determined whether the electric power X generated by the solar panel 11 exceeds the threshold $\alpha$ at which the efficiency of use of the generated electric power X in the second mode is higher than the efficiency of use of the generated electric power X in the first mode. When the generated electric power X exceeds the threshold $\alpha$ (Yes in S302), the process proceeds to step S303. On the other hand, when the generated electric power X does not exceed the threshold $\alpha$ (No in S302), the process of step S302 is determined again.

In step S303, it is determined whether a time T2 elapsing from when the charge mode is switched from the first mode to the second mode has reached a predetermined time T1. This determination is carried out in order to, when the electric power X generated by the solar panel 11 has varied across the threshold $\alpha$, switch the charge mode at timing different from the timing at which the generated electric power X varies across the threshold $\alpha$ (T2≥T1). The predetermined time T1 may be, for example, set to a time that is required for the process of charging the solar battery 12 with the generated electric power X, which is executed in the first mode, and the process of charging the drive battery 13 with the electric power stored in the solar battery 12, and that is determined based on the electric power X generated by the solar panel 11.

When the elapsed time T2 has reached the predetermined time T1 (Yes in S303), the process proceeds to step S304 (process (1) in FIG. 4). On the other hand, when the elapsed time T2 has not reached the predetermined time T1 (No in S303), the process returns to step S302.

In step S304, the charge mode is switched from the first mode to the second mode. Thus, the second-mode charge process is executed. In the first charge control, all the electric power X generated by the solar panel 11 is directly charged into the drive battery 13. As the charge mode is switched, the process proceeds to step S305.

In step S305, the elapsed time T2 till then is reset, and counting of the elapsed time T2 is newly started. As counting is newly started, the process returns to step S301 for determining the charge mode.

In step S306, accumulation of cumulative amounts S1, S2 of generated electric power is started. As shown in FIG. 5, the cumulative amount S1 of generated electric power is an amount obtained by accumulatively integrating an amount of electric power exceeding the threshold $\alpha$ out of the electric power X generated by the solar panel 11 for a predetermined period. As shown in FIG. 5, the cumulative amount S2 of generated electric power is an amount obtained by accumulatively integrating an amount of electric power shorter than or equal to the threshold $\alpha$ out of the electric power X generated by the solar panel 11 for the predetermined period. As accumulation of the cumulative amounts of generated electric power is started, the process proceeds to step S307.

In step S307, it is determined whether the electric power X generated by the solar panel 11 becomes lower than or equal to the threshold $\alpha$ at which the efficiency of use of the generated electric power X in the first mode is higher than the efficiency of use of the generated electric power X in the second mode. When the generated electric power X becomes lower than or equal to the threshold $\alpha$ (Yes in S307), the process proceeds to step S308. On the other hand, when the generated electric power X is not lower than or equal to the threshold $\alpha$ (No in S307), the process of step S307 is determined again.

In step S308, it is determined whether the electric power X generated by the solar panel 11 exceeds a predetermined threshold $\beta$ (which corresponds to a "second threshold" in the disclosure) lower than the threshold $\alpha$. This determination is carried out in order to, when the electric power X generated by the solar panel 11 has varied across the threshold $\alpha$, switch the charge mode at timing different from the timing at which the generated electric power X varies across the threshold $\alpha$ (X≤$\beta$). The threshold $\beta$ may be set to a point at which it is determined that the efficiency of use of the electric power X generated by the solar panel 11 remarkably decreases in the charge control system 1. For example, when electric power that is consumed by the battery monitoring unit 15 is higher than the electric power X generated by the solar panel 11, there is no advantage in charging the drive battery 13 with the generated electric power X, so the electric power that is consumed by the battery monitoring unit 15 may be set for the threshold $\beta$.

When the generated electric power X exceeds the threshold $\beta$ (Yes in S308), the process proceeds to step S309 (process (2) of FIG. 4). On the other hand, when the generated electric power X does not exceed the threshold $\beta$ (No in S308), the process proceeds to step S310.

In step S309, it is determined whether the cumulative amount S2 of generated electric power exceeds the cumulative amount S1 of generated electric power. This determination is also carried out in order to, when the electric power X generated by the solar panel 11 has varied across the threshold $\alpha$, switch the charge mode at timing different from the timing at which the generated electric power X varies across the threshold $\alpha$ (S2>S1). By comparing the cumulative amount S1 of generated electric power with the cumulative amount S2 of generated electric power, it is possible to detect the fact that the efficiency of use has decreased in the second-mode charge process.

When the cumulative amount S2 of generated electric power exceeds the cumulative amount S1 of generated electric power (Yes in S309), the process proceeds to step S310 (process (3) of FIG. 4). On the other hand, when the cumulative amount S2 of generated electric power does not exceed the cumulative amount S1 of generated electric power (No in S309), the process returns to step S307.

In step S310, the charge mode is switched from the second mode to the first mode. Thus, the first-mode charge process is executed. In the first charge control, the process A of charging the solar battery 12 with the electric power X generated by the solar panel 11 and the process B of charging the drive battery 13 with the electric power X generated by the solar panel 11 and the electric power stored in the solar battery 12 are repeated depending on the state of charge of the solar battery 12. As the charge mode is switched, the process proceeds to step S311.

In step S311, the cumulative amounts S1, S2 of generated electric power are reset. As the cumulative amounts of generated electric power are reset, the process returns to step S301 for determining the charge mode.

Figure 6:
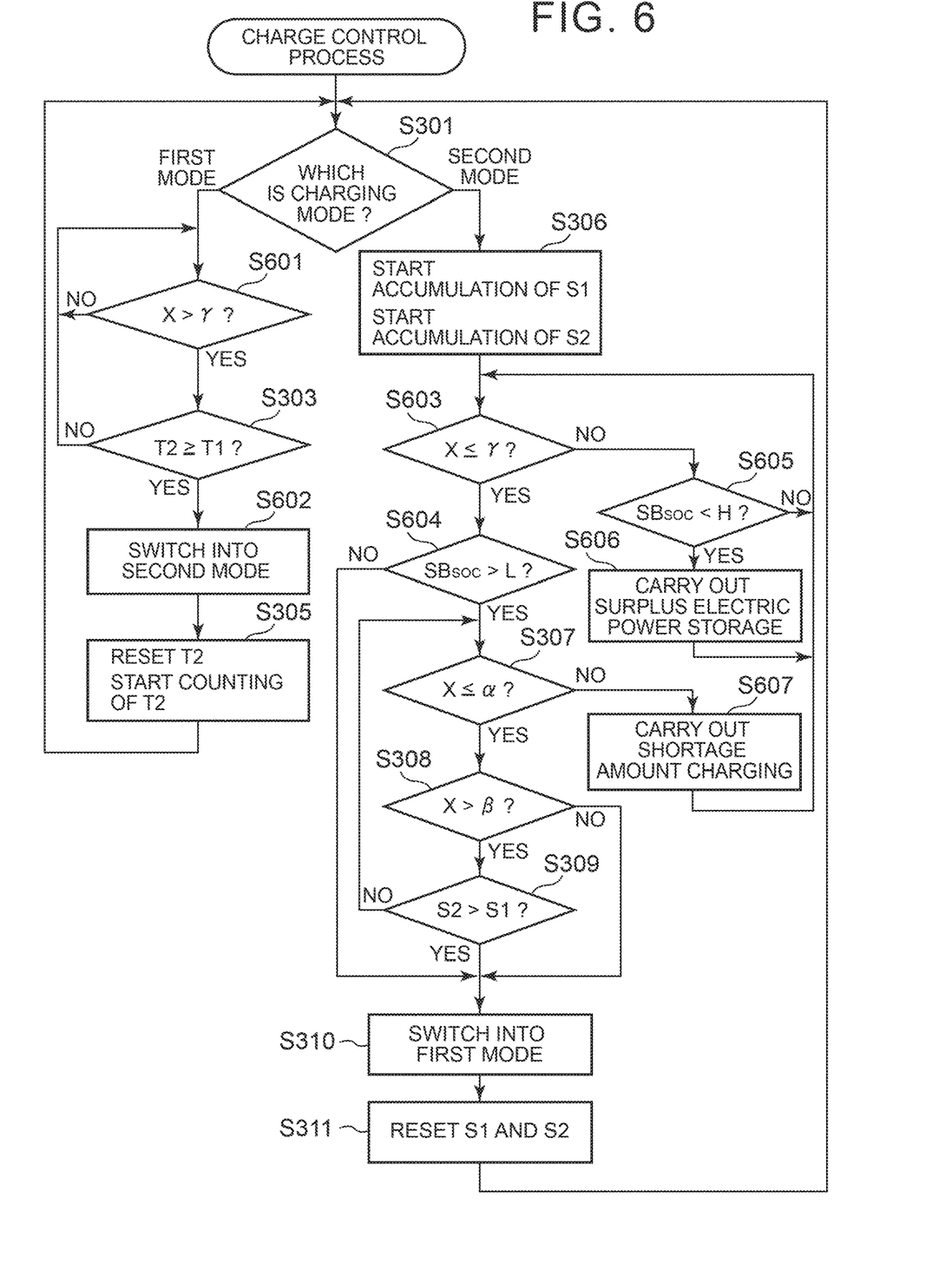
FIG. 6 is a flowchart that illustrates the procedure of second charge control that the charge control unit executes.
Figure 7:
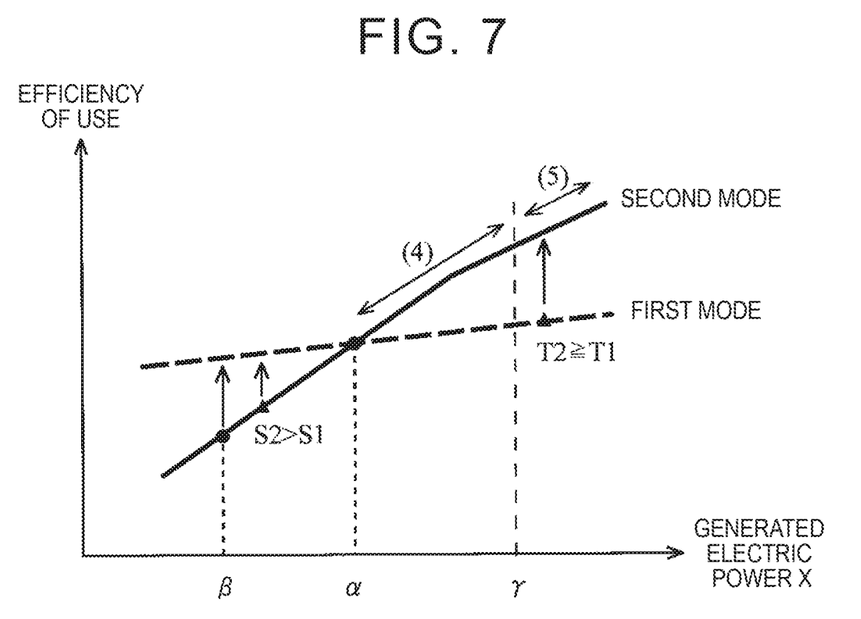
FIG. 7 is a graph that shows mode switching timing in the second charge control.
Figure 8:
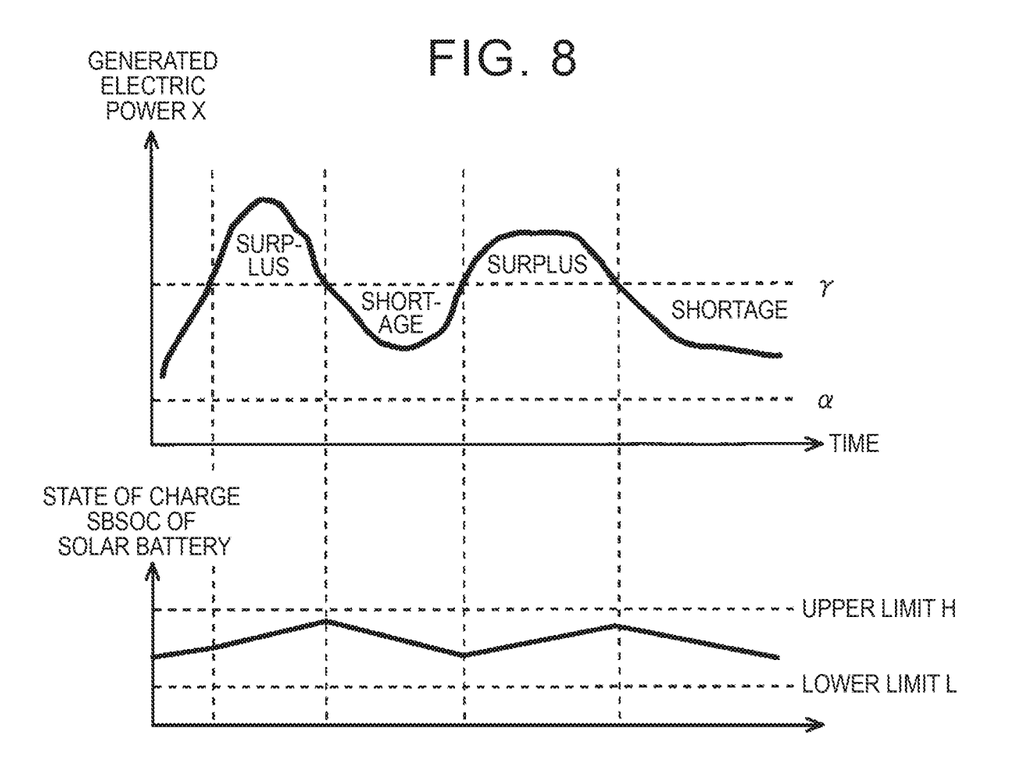
FIG. 8 is a graph that shows an example of fluctuations in generated electric power in the second-mode charge process.

Next, second charge control will be described. FIG. 6 is a flowchart that illustrates the procedure of the second charge control that the charge control unit 14 of the charge control system 1 executes. FIG. 7 is a graph that shows the timing of switching between the first mode and the second mode in the second charge control. FIG. 8 is a graph that shows an example of fluctuations in generated electric power X in the second-mode charge process.

The second charge control shown in FIG. 6 differs from the above-described first charge control shown in FIG. 3 in the processes of step S601 to step S607. Hereinafter, the second charge control will be described with a focus on these different processes.

In step S301, it is determined whether the currently executing charge mode is the first mode or the second mode. When the charge mode is the first mode, the process proceeds to step S601. When the charge mode is the second mode, the process proceeds to step S306.

In step S601, it is determined whether the electric power X generated by the solar panel 11 exceeds a predetermined threshold γ (which corresponds to a "third threshold" in the disclosure) higher than the threshold α. This determination is carried out in order to determine whether the electric power X generated by the solar panel 11 satisfies a charging permission electric power value that is a minimum required electric power value for charging, which is set for the drive battery 13 in advance. Thus, the threshold γ may be set to the charging permission electric power value.

When the generated electric power X exceeds the threshold γ (Yes in S601), the process proceeds to step S303. On the other hand, when the generated electric power X does not exceed the threshold γ (No in S601), the process of step S601 is determined again.

In step S303, it is determined whether the time T2 elapsing from when the charge mode is switched from the first mode to the second mode has reached the predetermined time T1. When the elapsed time T2 has reached the predetermined time T1 (Yes in S303), the process proceeds to step S602. On the other hand, when the elapsed time T2 has not reached the predetermined time T1 (No in S303), the process returns to step S601.

In step S602, the charge mode is switched from the first mode to the second mode. Thus, the second-mode charge process is executed. In the second charge control, an amount of electric power up to the threshold γ, which is part of the electric power X generated by the solar panel 11, is directly charged into the drive battery 13. As the charge mode is switched, the process proceeds to step S305.

In step S306, accumulation of the cumulative amounts S1, S2 of generated electric power is started. As accumulation of the cumulative amounts of generated electric power is started, the process proceeds to step S603.

In step S603, it is determined whether the electric power X generated by the solar panel 11 is lower than or equal to the threshold γ. This determination is also carried out in order to determine whether the electric power X generated by the solar panel 11 satisfies a minimum required charging permission electric power value for charging, which is set in the drive battery 13 in advance. When the generated electric power X is lower than or equal to the threshold γ (Yes in S603), the process proceeds to step S604 (range (4) of FIG. 7). On the other hand, when the generated electric power X exceeds the threshold γ (No in S603), the process proceeds to step S605 (range (5) of FIG. 7).

In step S604, it is determined whether the state of charge $SB_{SOC}$ of the solar battery 12 exceeds a predetermined lower limit L. This determination is carried out in order to avoid a situation in which the state of charge $SB_{SOC}$ of the solar battery 12 reaches an overdischarged state. Thus, the lower limit L is set based on the state of charge at which the state of charge $SB_{SOC}$ becomes an overdischarged state. When the state of charge $SB_{SOC}$ exceeds the lower limit L (Yes in S604), the process proceeds to step S307. On the other hand, when the state of charge $SB_{SOC}$ is lower than or equal to the lower limit L (No in S604), the process proceeds to step S310.

In step S307, it is determined whether the electric power X generated by the solar panel 11 is lower than or equal to the threshold α. When the generated electric power X is lower than or equal to the threshold α (Yes in S307), the process proceeds to step S308. On the other hand, when the generated electric power X exceeds the threshold α (No in S307), the process proceeds to step S607.

In step S605, it is determined whether the state of charge $SB_{SOC}$ of the solar battery 12 is lower than a predetermined upper limit H. This determination is carried out in order to avoid a situation in which the state of charge $SB_{SOC}$ of the solar battery 12 reaches an overcharged state. Thus, the upper limit H is set based on the state of charge at which the state of charge $SB_{SOC}$ becomes an overcharged state. When the state of charge $SB_{SOC}$ is lower than the upper limit H (Yes in S605), the process proceeds to step S606. On the other hand, when the state of charge $SB_{SOC}$ is higher than or equal to the upper limit H (No in S605), the process returns to step S603.

In step S606, a process of storing an amount of electric power exceeding the threshold γ, that is, remaining surplus electric power that is not directly charged into the drive battery 13, out of the electric power X generated by the solar panel 11, in the solar battery 12 (surplus electric power storage) is executed. As shown in FIG. 8, during a "surplus" period in which the generated electric power X exceeds the threshold γ, surplus electric power is stored in the solar battery 12, and the state of charge $SB_{SOC}$ increases. As the surplus electric power storage is carried out, the process returns to step S603.

In step S607, in order to satisfy an amount of electric power up to the threshold γ, a process of charging the drive battery 13 by discharging an amount of electric power corresponding to a shortage of the electric power X generated by the solar panel 11 from the solar battery 12 (shortage amount charging) is executed. As shown in FIG. 8, during a "shortage" period in which the generated electric power X is lower than the threshold γ, electric power is drawn from the solar battery 12 to the drive battery 13, and the state of charge $SB_{SOC}$ decreases. As the shortage amount charging is carried out, the process returns to step S603.

Next, an alternative embodiment of charge control will be described. In each of step S307, step S308, step S309 and step S603, determination may be carried out after a lapse of a predetermined time (for example, a minute) so that an instantaneous switching of the charge mode does not occur with instantaneous fluctuations in generated electric power X.

The magnitude of the electric power X generated by the solar panel 11, which is compared and determined in each of step S302, step S307, step S308, step S601 and step S603, may be obtained from a solar irradiance that the solar panel 11 receives and that is acquired by a newly additionally provided solar irradiance acquisition device. The threshold α that is compared and determined in step S302 and the threshold α that is compared and determined in step S307 may be set to different values.

Reset of the elapsed time T2 and a start of counting again in step S305 may be carried out after the charge mode is switched into the first mode in step S310. In comparison and determination that are carried out in step S303, instead of the time T2 elapsed from switching of the charge mode, the number of times the charge mode is switched may be used as a determination reference.

In comparison and determination that are carried out in step S308, instead of the threshold β, the amount of fluctuations in the electric power X generated by the solar panel 11 within a certain period of time may be used as a determination reference. In comparison and determination that are carried out in step S308, instead of the threshold β, input/output current (electric power) of an auxiliary battery, which is acquired by a newly additionally provided auxiliary battery input/output current acquisition device, may be used as a determination reference.

In comparison and determination that are carried out in each of step S306 and step S309, instead of an amount obtained by accumulatively integrating an amount of electric power exceeding or shorter than or equal to the threshold α out of the electric power X generated by the solar panel 11 for a predetermined period, a period of time obtained by accumulatively adding a period during which the generated electric power X exceeds or is lower than or equal to the threshold α may be used as a determination reference.

Furthermore, without carrying out comparison and determination in each of step S303, step S308 and step S309, the charge mode may be switched (step S304, step S602 or step S310) immediately at the time when it is determined in step S302 or step S307 that the generated electric power X exceeds or is lower than or equal to the threshold α or at the time when it is determined in step S601 that the generated electric power X exceeds the threshold γ.

Next, the operation and advantageous effects of the present embodiment will be described. As described above, with the charge control system 1 and the charge control method for the charge control system 1 according to the embodiment of the disclosure, the charge mode is, for example, switched between the first mode and the second mode based on at least the magnitude of the electric power X generated by the solar panel 11 such that the efficiency of use of the generated electric power X improves. Thus, it is possible to prevent charging of the drive battery 13 while the efficiency of use of the generated electric power X remains low. Since the second mode is executed, it is possible to reduce the number of times of the process of alternately charging and discharging the solar battery 12 in the first mode.

Since the charge mode is not immediately switched even when the electric power X generated by the solar panel 11 has varied across the threshold α, it is possible to avoid so-called control chattering that the first mode and the second mode are frequently switched as a result of instantaneous fluctuations in the electric power X generated by the solar panel 11.

When a lower limit electric power value up to which a decrease in the efficiency of use of the electric power generated by the solar panel 11 in the charge control system 1 is permitted is set for the threshold β, it is possible to continuously execute the second mode in the range in which a decrease in the efficiency of use is permitted. Thus, it is possible to reduce the number of times of the process of alternately charging and discharging the solar battery 12 in the first mode.

Even when the electric power X generated by the solar panel 11 has not reached the threshold β, when it is determined that the efficiency of use of the electric power generated by the solar panel 11 has remarkably decreased based on the cumulative amounts S1, S2 of generated electric power, it is possible to switch the charge mode from the second mode to the first mode. Thus, it is possible to reduce the number of times of the process of alternately charging and discharging the solar battery 12 in the first mode, and it is possible to prevent execution of the second-mode charge process while the efficiency of use of the generated electric power X remains low.

Even when the electric power X generated by the solar panel 11 exceeds the threshold α, it is possible to continuously execute the first mode until the predetermined time T2 elapses. Thus, it is possible to avoid a situation in which the first mode and the second mode are frequently switched as a result of instantaneous fluctuations in the electric power X generated by the solar panel 11.

When the charge mode is switched into the second mode, as long as the electric power X generated by the solar panel 11 exceeds the threshold γ, it is possible to directly charge the drive battery 13 with at least an amount of electric power up to the threshold γ out of the generated electric power X and charge the solar battery 12 with remaining surplus electric power that is not used for direct charging. Thus, for example, when the drive battery 13 has a minimum required charging permission electric power value (threshold γ) set in advance for charging, it is possible to charge the solar battery 12 with an amount of surplus electric power exceeding the threshold γ out of the electric power X generated by the solar panel 11 without waste without, for example, discarding the surplus electric power.

At this time, in order to avoid a situation in which the solar battery 12 becomes an overcharged state, when the state of charge $SB_{SOC}$ of the solar battery 12 has increased to the predetermined upper limit H, it is desirable not to charge the solar battery 12 with surplus electric power.

When the charge mode is switched into the second mode, as long as the electric power X generated by the solar panel 11 does not exceed the threshold γ, it is possible to directly charge the drive battery 13 with all the generated electric power X and charge the drive battery 13 from the solar battery 12 with an amount of electric power by which the generated electric power X is shorter than the threshold γ. Thus, for example, when the drive battery 13 has a charging permission electric power value (threshold γ) set in advance, it is possible to continuously execute the second mode by charging the drive battery 13 from the solar battery 12 with an amount of electric power by which the electric power X generated by the solar panel 11 is shorter than the threshold γ. Therefore, it is possible to avoid a situation in which the first mode and the second mode are frequently switched.

At this time, in order to avoid a situation in which the solar battery 12 becomes an overdischarged state, when the state of charge $SB_{SOC}$ of the solar battery 12 has decreased to the predetermined lower limit L, it is desirable to switch the charge mode into the first mode.

The disclosure is usable in a charge control system for, for example, a vehicle, which uses electric power generated by a solar panel.

What is claimed is:
1. A charge control system comprising:
   a solar panel configured to generate electric power with sunlight;
   a first battery configured to be chargeable and dischargeable;
   a second battery configured to be chargeable and dischargeable; and a charge control unit connected to the solar panel, the first battery and the second battery, the charge control unit being configured to switch between a first mode and a second mode based on at least a magnitude of the electric power generated by the solar panel, the first mode being an indirect charge mode in which a process of charging the first battery with the electric power generated by the solar panel and a process of charging the second battery with electric power stored in the first battery are repeatedly executed depending on a state of charge of the first battery, the second mode being a direct charge mode in which the electric power generated by the solar panel is directly charged into the second battery, wherein the charge control unit is configured to change the charge mode at timing different from timing at which the magnitude of the generated electric power varies across a first threshold such that the charge control unit selects one charge mode having a higher efficiency of use of the generated electric power than efficiency of use of the generated electric power of another charge mode, when the magnitude of the electric power generated by the solar panel varies across the first threshold at which a relationship, that is whether or not the efficiency of use of the generated electric power in the first mode is higher than the efficiency of use of the generated electric power in the second mode, changes.

2. The charge control system according to claim 1, wherein
the first threshold is a value that is obtained based on factors including an electric power consumption and an electric power loss in the charge control system.

3. The charge control system according to claim 1, wherein
the charge control unit is configured to change the charge mode from the second mode into the first mode, when, during execution of the second mode, the magnitude of the electric power generated by the solar panel becomes lower than or equal to a second threshold lower than the first threshold.

4. The charge control system according to claim 3, wherein
the second threshold is a lower limit electric power value up to which a decrease in the efficiency of use of the electric power generated by the solar panel is permitted.

5. The charge control system according to claim 3, wherein
the charge control unit is configured to change the charge mode into the first mode, when the magnitude of the electric power generated by the solar panel falls in a range from the first threshold to the second threshold and, during execution of the second mode, a cumulative amount of the generated electric power exceeding the first threshold during a predetermined period becomes smaller than a cumulative amount of the generated electric power shorter than or equal to the first threshold during the predetermined period.

6. The charge control system according to claim 1, wherein
the charge control unit is configured to change the charge mode into the second mode after a lapse of a predetermined time from when the charge mode has been switched, when the magnitude of the electric power generated by the solar panel exceeds the first threshold during execution of the first mode.

7. The charge control system according to claim 6, wherein
the charge control unit is configured to directly charge the second battery with at least an amount of electric power up to a third threshold out of the electric power generated by the solar panel and charge the first battery with remaining surplus electric power that is not directly charged into the second battery, when the charge mode has been switched into the second mode, as long as the magnitude of the electric power generated by the solar panel exceeds the third threshold higher than the first threshold.

8. The charge control system according to claim 7, wherein
the third threshold is a minimum required electric power value for charging the second battery.

9. The charge control system according to claim 7, wherein
the charge control unit is configured to not charge the first battery with the surplus electric power, even when the magnitude of the electric power generated by the solar panel exceeds the third threshold but when the state of charge of the first battery increases to a predetermined upper limit.

10. The charge control system according to claim 6, wherein
the charge control unit is configured to directly charge the second battery with all the electric power generated by the solar panel and charge the second battery from the first battery with electric power corresponding to a shortage of the generated electric power below a third threshold, when the charge mode has been switched into the second mode, as long as the magnitude of the electric power generated by the solar panel does not exceed the third threshold higher than the first threshold.

11. The charge control system according to claim 10, wherein
the charge control unit is configured to change the charge mode into the first mode, even when the magnitude of the electric power generated by the solar panel does not exceed the third threshold but when the state of charge of the first battery decreases to a predetermined lower limit.

12. A charge control method that is executed by a control device that controls charging of a battery based on electric power generated by a solar panel that generates electric power with sunlight, the charge control method comprising:
executing a first mode that is an indirect charge mode in which a process of charging a chargeable and dischargeable first battery with the electric power generated by the solar panel and a process of indirectly charging a chargeable and dischargeable second battery with electric power stored in the first battery are repeatedly executed depending on a state of charge of the first battery;
executing a second mode that is a direct charge mode in which the second battery is directly charged with the electric power generated by the solar panel; and
changing a charge mode between the first mode and the second mode based on at least a magnitude of the electric power generated by the solar panel,
wherein the control device is configured to change the charge mode at timing different from timing at which the magnitude of the generated electric power varies across a first threshold such that the control device selects one charge mode having a higher efficiency of use of the generated electric power than efficiency of use of the generated electric power of another charge mode, when the magnitude of the electric power generated by the solar panel varies across the first threshold at which a relationship, that is whether or not the efficiency of use of the generated electric power in the first mode is higher than the efficiency of use of the generated electric power in the second mode, changes.

* * * * *